(12) United States Patent
Grijalva et al.

(10) Patent No.: US 7,380,030 B2
(45) Date of Patent: May 27, 2008

(54) METHOD AND SYSTEM FOR USING AN IN-LINE CREDIT EXTENDER WITH A HOST BUS ADAPTER

(75) Inventors: Oscar J. Grijalva, Cypress, CA (US); Jerald K. Alston, Coto de Caza, CA (US); Eric R. Griffith, Yorba Linda, CA (US); James A. Kunz, Plymouth, MN (US)

(73) Assignee: QLOGIC, Corp., Aliso Viejo, CA (US)

( * ) Notice: Subject to any disclaimer, the term of this patent is extended or adjusted under 35 U.S.C. 154(b) by 509 days.

(21) Appl. No.: 10/956,718

(22) Filed: Oct. 1, 2004

(65) Prior Publication Data

US 2006/0075161 A1 Apr. 6, 2006

(51) Int. Cl.
*G06F 3/00* (2006.01)

(52) U.S. Cl. .......................... 710/57; 710/52; 709/220; 709/221; 709/222

(58) Field of Classification Search .................. 710/57, 710/52
See application file for complete search history.

(56) References Cited

U.S. PATENT DOCUMENTS

| 4,162,375 A | 7/1979 | Schilichte | .................... 179/15 |
| 4,268,906 A | 5/1981 | Bourke et al. | |
| 4,333,143 A | 6/1982 | Calder | |
| 4,382,159 A | 5/1983 | Bowditch | |
| 4,425,640 A | 1/1984 | Philip et al. | .................... 370/58 |
| 4,449,182 A | 5/1984 | Rubinson | |
| 4,475,192 A | 10/1984 | Fernow et al. | |
| 4,546,468 A | 10/1985 | Christmas et al. | ............ 370/54 |
| 4,549,263 A | 10/1985 | Calder | |
| 4,569,043 A | 2/1986 | Simmons et al. | ............. 370/63 |
| 4,725,835 A | 2/1988 | Schreiner et al. | ...... 340/825.83 |
| 4,777,595 A | 10/1988 | Strecker et al. | |
| 4,783,730 A | 11/1988 | Fischer | |
| 4,783,739 A | 11/1988 | Calder | |

(Continued)

FOREIGN PATENT DOCUMENTS

EP 0649098 9/1994

(Continued)

OTHER PUBLICATIONS

Banks, David C., et al., "Link Trunking and Measuring Link Latency in Fibre Channel Fabric", U.S. Appl. No. 60/286,046, 1-52.

(Continued)

*Primary Examiner*—Niketa Patel
(74) *Attorney, Agent, or Firm*—Klein, O'Neill & Singh, LLP; TJ Singh (57) ABSTRACT

A storage area network ("SAN") and a system is provided. The SAN includes, a host bus adapter operationally coupled with a credit extender, wherein the credit extender receives frames from a Fibre Channel network and sends the received frames to the HBA based on buffer space available in the HBA. The HBA notifies other Fibre Channel ports of buffer space available in the credit extender. The HBA sends a signal to the credit extender notifying the credit extender of available buffer space in the HBA. The HBA includes a management port for interfacing the HBA with the credit extender.

18 Claims, 5 Drawing Sheets

U.S. PATENT DOCUMENTS

| | | | |
|---|---|---|---|
| 4,803,622 A | 2/1989 | Bain, Jr. et al. | |
| 4,821,034 A | 4/1989 | Anderson et al. | 340/825 |
| 5,129,064 A | 7/1992 | Fogg, Jr. et al. | |
| 5,144,622 A | 9/1992 | Takiyasu et al. | 370/85.13 |
| 5,212,795 A | 5/1993 | Hendry | |
| 5,249,279 A | 9/1993 | Schmenk et al. | |
| 5,276,807 A | 1/1994 | Kodama et al. | |
| 5,321,816 A | 6/1994 | Rogan et al. | |
| 5,347,638 A | 9/1994 | Desai et al. | |
| 5,367,520 A | 11/1994 | Cordell | 370/60 |
| 5,371,861 A | 12/1994 | Keener et al. | |
| 5,448,702 A | 9/1995 | Garcia, Jr. et al. | |
| 5,528,591 A | 6/1996 | Lauer | |
| 5,568,614 A | 10/1996 | Mendelson et al. | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,633,867 A | 5/1997 | Ben-Nun et al. | |
| 5,664,197 A | 9/1997 | Kardach et al. | |
| 5,671,365 A | 9/1997 | Binford et al. | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,729,762 A | 3/1998 | Kardach et al. | |
| 5,740,467 A | 4/1998 | Chmielecki, Jr. et al. | |
| 5,748,612 A | 5/1998 | Stoevhase et al. | 370/230 |
| 5,758,187 A | 5/1998 | Young | |
| 5,761,427 A | 6/1998 | Shah et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,825,748 A | 10/1998 | Barkey et al. | |
| 5,828,475 A | 10/1998 | Bennett et al. | |
| 5,828,903 A | 10/1998 | Sethuram et al. | |
| 5,835,752 A | 11/1998 | Chiang et al. | |
| 5,875,343 A | 2/1999 | Binford et al. | |
| 5,881,296 A | 3/1999 | Williams et al. | |
| 5,892,969 A | 4/1999 | Young | |
| 5,894,560 A | 4/1999 | Carmichael et al. | |
| 5,905,905 A | 5/1999 | Dailey et al. | |
| 5,917,723 A | 6/1999 | Binford | |
| 5,954,796 A | 9/1999 | McCarty et al. | |
| 5,968,143 A | 10/1999 | Chisholm et al. | |
| 5,978,359 A | 11/1999 | Caldara et al. | |
| 5,983,292 A | 11/1999 | Nordstorm et al. | |
| 5,987,028 A | 11/1999 | Yang et al. | 370/380 |
| 5,999,528 A | 12/1999 | Chow et al. | 370/365 |
| 6,006,340 A | 12/1999 | O'Connell | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,047,323 A | 4/2000 | Krause | 709/227 |
| 6,049,802 A | 4/2000 | Waggener, Jr. et al. | |
| 6,055,603 A | 4/2000 | Ofer et al. | |
| 6,055,618 A | 4/2000 | Thorson | |
| 6,061,360 A | 5/2000 | Miller et al. | |
| 6,078,970 A | 6/2000 | Nordstorm et al. | |
| 6,081,512 A | 6/2000 | Muller et al. | 370/256 |
| 6,085,277 A | 7/2000 | Nordstorm et al. | |
| 6,105,122 A | 8/2000 | Muller et al. | |
| 6,108,738 A | 8/2000 | Chambers et al. | |
| 6,108,778 A | 8/2000 | LaBerge | |
| 6,115,761 A | 9/2000 | Daniel et al. | |
| 6,118,776 A | 9/2000 | Berman | |
| 6,128,292 A | 10/2000 | Kim et al. | 370/356 |
| 6,134,617 A | 10/2000 | Weber | |
| 6,138,176 A | 10/2000 | McDonald et al. | |
| 6,144,668 A | 11/2000 | Bass et al. | |
| 6,160,813 A | 12/2000 | Banks et al. | 370/422 |
| 6,185,203 B1 | 2/2001 | Berman | |
| 6,185,620 B1 | 2/2001 | Weber et al. | |
| 6,201,787 B1 | 3/2001 | Baldwin et al. | |
| 6,233,244 B1 | 5/2001 | Runaldue et al. | |
| 6,240,096 B1 | 5/2001 | Book | |
| 6,253,267 B1 | 6/2001 | Kim et al. | |
| 6,269,413 B1 | 7/2001 | Sherlock | |
| 6,289,002 B1 | 9/2001 | Henson et al. | |
| 6,289,386 B1 | 9/2001 | Vangemert | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,343,324 B1 | 1/2002 | Hubis et al. | |
| 6,353,612 B1 | 3/2002 | Zhu et al. | |
| 6,401,128 B1 | 6/2002 | Stai et al. | |
| 6,408,349 B1 | 6/2002 | Castellano | |
| 6,411,599 B1 | 6/2002 | Blanc et al. | 370/219 |
| 6,421,711 B1 | 7/2002 | Blumenau et al. | |
| 6,424,658 B1 | 7/2002 | Mathur | 370/429 |
| 6,425,021 B1 | 7/2002 | Ghodrat et al. | |
| 6,425,034 B1 | 7/2002 | Steinmetz et al. | |
| 6,434,630 B1 | 8/2002 | Micalizzi, Jr. et al. | |
| 6,449,274 B1 | 9/2002 | Holden et al. | 370/392 |
| 6,457,090 B1 | 9/2002 | Young | |
| 6,463,032 B1 | 10/2002 | Lau et al. | |
| 6,467,008 B1 | 10/2002 | Gentry | 710/201 |
| 6,470,007 B1 | 10/2002 | Berman | |
| 6,484,173 B1 | 11/2002 | O'Hare et al. | |
| 6,502,189 B1 | 12/2002 | Westby | |
| 6,504,846 B1 | 1/2003 | Yu et al. | |
| 6,532,212 B1 | 3/2003 | Soloway et al. | |
| 6,546,010 B1 | 4/2003 | Merchant et al. | |
| 6,564,271 B2 | 5/2003 | Micalizzi, Jr. et al. | |
| 6,594,231 B1 | 7/2003 | Byham et al. | |
| 6,594,329 B1 | 7/2003 | Susnow | |
| 6,597,691 B1 | 7/2003 | Anderson et al. | 370/360 |
| 6,597,777 B1 | 7/2003 | Ho | |
| 6,614,796 B1 | 9/2003 | Black et al. | |
| 6,643,748 B1 | 11/2003 | Wieland | |
| 6,647,019 B1 | 11/2003 | McKeown et al. | |
| 6,697,359 B1 | 2/2004 | George | 370/357 |
| 6,697,368 B2 | 2/2004 | Chang et al. | |
| 6,718,497 B1 | 4/2004 | Whitby-Strevens | |
| 6,721,799 B1 | 4/2004 | Slivkoff | |
| 6,725,388 B1 | 4/2004 | Susnow | |
| 6,744,772 B1 | 6/2004 | Eneboe et al. | |
| 6,760,302 B1 | 7/2004 | Ellinas et al. | |
| 6,785,241 B1 | 8/2004 | Lu et al. | |
| 6,807,181 B1 | 10/2004 | Weschler | |
| 6,810,440 B2 | 10/2004 | Micalizzi, Jr. et al. | |
| 6,810,442 B1 | 10/2004 | Lin et al. | |
| 6,816,750 B1 | 11/2004 | Klaas | |
| 6,839,747 B1 | 1/2005 | Blumenau et al. | |
| 6,859,435 B1 | 2/2005 | Lee et al. | |
| 6,865,157 B1 | 3/2005 | Scott et al. | |
| 6,886,141 B1 | 4/2005 | Kunz et al. | |
| 6,904,053 B1 | 6/2005 | Berman | |
| 6,941,357 B2 | 9/2005 | Nguyen et al. | |
| 6,941,482 B2 | 9/2005 | Strong | |
| 6,952,659 B2 | 10/2005 | King et al. | |
| 6,968,463 B2 | 11/2005 | Pherson et al. | |
| 6,980,525 B2 | 12/2005 | Banks et al. | |
| 7,000,025 B1 * | 2/2006 | Wilson | 709/235 |
| 7,002,926 B1 | 2/2006 | Eneboe et al. | |
| 7,039,870 B2 | 5/2006 | Takaoka et al. | |
| 7,047,326 B2 | 5/2006 | Crosbie et al. | |
| 7,050,392 B2 | 5/2006 | Valdevit | |
| 7,055,068 B2 | 5/2006 | Riedl | |
| 7,061,871 B2 | 6/2006 | Sheldon et al. | |
| 7,092,374 B1 | 8/2006 | Gubbi | |
| 7,110,394 B1 | 9/2006 | Chamdani et al. | |
| 7,151,778 B2 | 12/2006 | Zhu et al. | |
| 7,165,152 B2 | 1/2007 | Blumenau et al. | |
| 7,171,050 B2 | 1/2007 | Kim | |

| | | |
|---|---|---|
| 7,194,538 B1 | 3/2007 | Rabe et al. |
| 7,200,108 B2 | 4/2007 | Beer et al. |
| 7,221,650 B1 | 5/2007 | Cooper et al. |
| 7,248,580 B2 | 7/2007 | George et al. |
| 7,269,131 B2 | 9/2007 | Cashman et al. |
| 2001/0011357 A1 | 8/2001 | Mori |
| 2001/0038628 A1 | 11/2001 | Ofek et al. |
| 2002/0103913 A1 | 8/2002 | Tawil et al. |
| 2002/0104039 A1 | 8/2002 | DeRolf et al. |
| 2002/0147560 A1 | 10/2002 | Devins et al. |
| 2002/0147802 A1 | 10/2002 | Murotani et al. |
| 2002/0147843 A1 | 10/2002 | Rao |
| 2002/0156918 A1 | 10/2002 | Valdevit et al. |
| 2002/0172195 A1 | 11/2002 | Pekkala et al. |
| 2002/0191602 A1 | 12/2002 | Woodring et al. |
| 2003/0016683 A1 | 1/2003 | George et al. |
| 2003/0021239 A1 | 1/2003 | Mullendore et al. |
| 2003/0046396 A1 | 3/2003 | Richter et al. |
| 2003/0056000 A1 | 3/2003 | Mullendore et al. |
| 2003/0056032 A1 | 3/2003 | Micalizzi, Jr. et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0117961 A1 | 6/2003 | Chuah et al. |
| 2003/0120983 A1 | 6/2003 | Vieregge et al. |
| 2003/0137941 A1 | 7/2003 | Kaushik et al. |
| 2003/0174789 A1 | 9/2003 | Waschura et al. |
| 2003/0179709 A1 | 9/2003 | Huff |
| 2003/0179748 A1 | 9/2003 | George et al. ............. 370/389 |
| 2003/0189935 A1 | 10/2003 | Warden et al. |
| 2003/0236953 A1 | 12/2003 | Grieff et al. |
| 2004/0013092 A1 | 1/2004 | Betker et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0057389 A1 | 3/2004 | Klotz et al. |
| 2004/0081186 A1 | 4/2004 | Warren et al. |
| 2004/0081394 A1 | 4/2004 | Biren et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ...................... 370/463 |
| 2004/0153914 A1 | 8/2004 | El-Batal |
| 2004/0174813 A1 | 9/2004 | Kasper et al. |
| 2004/0267982 A1* | 12/2004 | Jackson et al. ............... 710/52 |
| 2005/0023656 A1 | 2/2005 | Leedy |
| 2005/0036499 A1 | 2/2005 | Dutt et al. |
| 2005/0058148 A1 | 3/2005 | Castellano et al. |
| 2005/0117522 A1 | 6/2005 | Basavaiah et al. |
| 2005/0141661 A1 | 6/2005 | Renaud et al. |
| 2005/0177641 A1 | 8/2005 | Yamagami |
| 2006/0047852 A1 | 3/2006 | Shah et al. |
| 2006/0074927 A1 | 4/2006 | Sullivan et al. |
| 2006/0156083 A1 | 7/2006 | Jang et al. |
| 2006/0184711 A1 | 8/2006 | Pettey |
| 2007/0124623 A1 | 5/2007 | Tseng |

FOREIGN PATENT DOCUMENTS

| | | |
|---|---|---|
| EP | 0738978 | 10/1996 |
| EP | 0856969 | 1/1998 |
| WO | WO 95/06286 | 3/1995 |
| WO | WO-98/36537 | 8/1998 |
| WO | WO 00/58843 | 10/2000 |
| WO | WO03/088050 | 10/2003 |

OTHER PUBLICATIONS

Brown, Douglas W., "A State-Machine Synthesizer", *18th Design Automation Conference*, (1981),301-305.

Curtis, A. R., "Design Considerations for 10-Gbit Fibre Channel", *Curtis A. Ridgeway, Distinguished I/O Architect, Storage and Computing ASIC's Division, LSI Logic Corp.*

Malavalli, Kumar, "High Speed Fibre Channel Switching Fabric Services", *Proceedings of the SPIE, SPIE*, Bellingham, VA, *USA* vol. 1577,, XP000562869, ISSN: 0277-786X,(Sep. 4, 1991),216-226.

Melhem, et al., "Minimizing Wavelength Conversions in WDM Path Establishment", *Computer Science Department*, University of Pittsburgh, Pittsburgh, PA 15260, (2001), 197-211.

Ridgeway, Curt , "0GFC-40GFC using 4-lane XAUI's", *LSI Logic Presentation—T11/03-069v0*.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03/369v0 dated Jun. 2, 2003.

Office Action dated Oct. 6, 2006, for co-pending U.S. Appl. No. 10/166,570- 18 Pages.

Response dated Feb. 26, 2007, to Office Action of Oct. 6, 2006, for co-pending U.S. Appl. No. 10/166,570 -25 Pages.

Office Action dated May 17, 2007, for co-pending U.S. Appl. No. 10/166,570 -18 Pages.

Response dated Aug. 17, 2007, to Office Action of May 17, 2007, for co-pending U.S. Appl. No. 10/166,570- 18 Pages.

Office Action dated Jul. 3, 2007, for co-pending U.S. Appl. No. 10/664,548- 18 Pages.

International Preliminary Report on Patentability dated Apr. 3, 2007, for International patent application No. PCT/US2005/034844.

International Preliminary Report on Patentability dated Apr. 3, 2007, for International patent application No. PCT/US2005/034758.

International Preliminary Report on Patentability dated Apr. 11, 2007, for International patent application No. PCT/US2005/034845.

International Preliminary Report on Patentability dated Apr. 3, 2007, for International patent application No. PCT/US2005/035064.

International Preliminary Report on Patentability dated Jul. 24, 2007, for International patent application No. PCT/US2005/42528.

Budruk, Ravi et al., "PCI Express System Architecture", (2004),434,436-439,442-443.

"PCI Express Base Specification Revision 1.0", (Apr. 29, 2002),195-196.

* cited by examiner

METHOD AND SYSTEM FOR USING AN IN-LINE CREDIT EXTENDER WITH A HOST BUS ADAPTER

BACKGROUND

1. Field of the Invention

The present invention relates to networking systems, and more particularly, to coupling a host bus adapter with an in-line credit extender.

2. Background of the Invention

Storage area networks ("SANs") are commonly used where plural memory storage devices are made available to various host computing systems. Data in a SAN is typically moved from plural host systems to storage systems through various controllers/adapters.

Host systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with storage systems via a host bus adapter ("HBA", may also be referred to as a "controller" and/or "adapter") using the "PCI" bus interface. PCI stands for Peripheral Component Interconnect, a local bus standard that was developed by INTEL Corporation®. The PCI standard is incorporated herein by reference in its entirety.

PCI-X is another standard bus that is compatible with existing PCI cards using the PCI bus. PCI-X improves the data transfer rate of PCI.

Various other standard interfaces are also used to move data from host systems to storage devices. Fibre Channel is one such standard. Fibre Channel (incorporated herein by reference in its entirety) is a set of AMERICAN NATIONAL STANDARD INSTITUTE (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

Fibre Channel is a closed system that relies on multiple ports to exchange information on attributes and characteristics to determine if the ports can operate together. If the ports can work together, they define the criteria under which they communicate. In Fibre Channel, a path is established between two nodes where the path's primary task is to transport data from one point to another.

Fibre Channel fabric devices include a node port or "N_Port" that manages fabric connections. The N_port establishes a connection to a fabric element (e.g., a switch) having a fabric port or F_port.

In Fibre Channel, a buffer-to-buffer credit mechanism is used to control frame flow on a Fibre Channel link. This mechanism requires a transmitter to receive credit in the form of an R_RDY primitive, before sending a frame. The destination sends an R_RDY only when it has adequate buffer space to accept an entire frame.

Once a transmitter has sent a frame for every R_RDY it has received, it stops transmission until another R_RDY arrives from the destination. Unless the transmitter receives enough R_RDYs to cover the time needed for a frame to travel across the link to the destination and an R_RDY to return across the link from the destination, the transmitter stalls and waits for an R_RDY.

Data throughput is hindered as the length of the Fibre Channel link increases in distance. In conventional systems, additional data buffering is used to allow more R_RDYs to be sent and minimize idle periods. This solution has drawbacks. For example, devices with large buffers waste memory resources when used in an environment that only uses short links. Also, using external memory buffers is expensive and requires additional pins and data ports.

Therefore, there is a need for a system that allows efficient data transfer without using additional memory buffers permanently.

SUMMARY OF THE INVENTION

In one aspect of the present invention, a storage area network ("SAN") is provided. The SAN includes, a host bus adapter operationally coupled with a credit extender, wherein the credit extender receives frames from a Fibre Channel network and sends the received frames to the HBA based on buffer space available in the HBA. The HBA notifies other Fibre Channel ports of buffer space available in the credit extender. The HBA sends a signal to the credit extender notifying the credit extender of available buffer space in the HBA.

In another aspect of the present invention, a system for transferring data in a Fibre Channel network is provided. The system includes, a HBA operationally coupled with a credit extender, wherein the credit extender receives frames from a Fibre Channel network and sends the received frames to the HBA based on buffer space available in the HBA.

In yet another aspect of the present invention, a HBA is provided. The HBA includes a management port for interfacing the HBA with a credit extender, wherein the credit extender receives frames from a Fibre Channel network and sends the received frames to the HBA based on buffer space available in the HBA.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided as they are typically (but not exclusively) used in the Fibre Channel environment, implementing the various adaptive aspects of the present invention.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"N-Port": A direct fabric attached port, for example, a disk drive or a HBA.

"SAN": Storage Area Network

To facilitate an understanding of the preferred embodiment, the general architecture and operation of a SAN, and a HBA will be described. The specific architecture and operation of the preferred embodiment will then be described with reference to the general architecture of the host system and HBA.

Figure 1A:
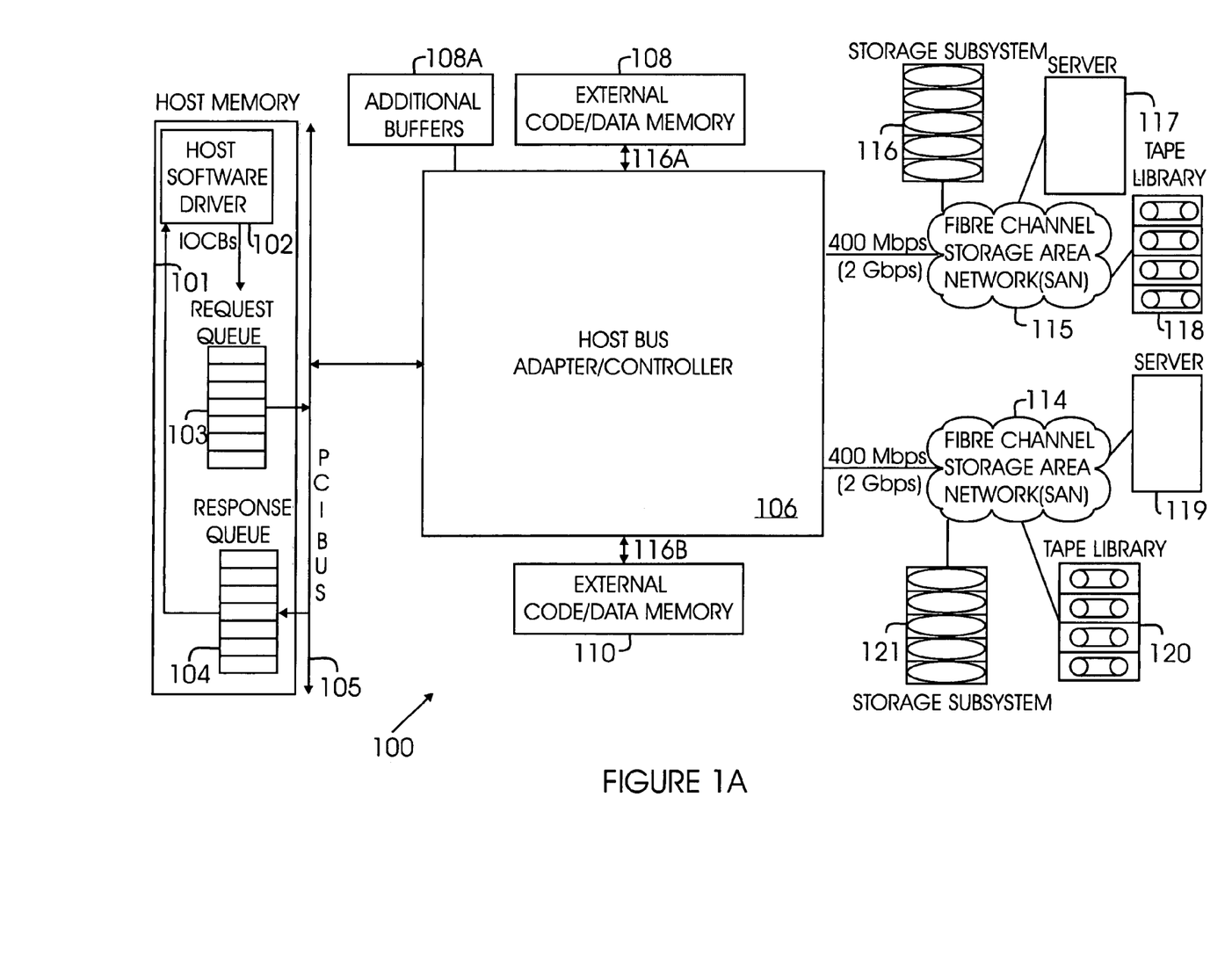
FIG. 1A shows a top-level block diagram of a network using a SAN.

FIG. 1A shows a SAN system 100 that uses a HBA 106 (referred to as "adapter 106") for communication between a host system (for example, 200, FIG. 2) with host memory 101 to various devices/systems (for example, storage subsystem 116 and 121, tape library 118 and 120 and servers 117 and 119) using Fibre Channel storage area networks 114 and 115. Host system 200 uses a driver 102 that co-ordinates data transfers via adapter 106 using input/output control blocks ("IOCBs").

A request queue 103 and response queue 104 is maintained in host memory 101 for transferring information using adapter 106. Host system 200 communicates with adapter 106 via a PCI bus 105 through a PCI core module (interface) 137, as shown in FIG. 1B.

In conventional systems, additional buffers 108A are used to increase link throughput for long distances and that results in wastage.

Figure 1B:
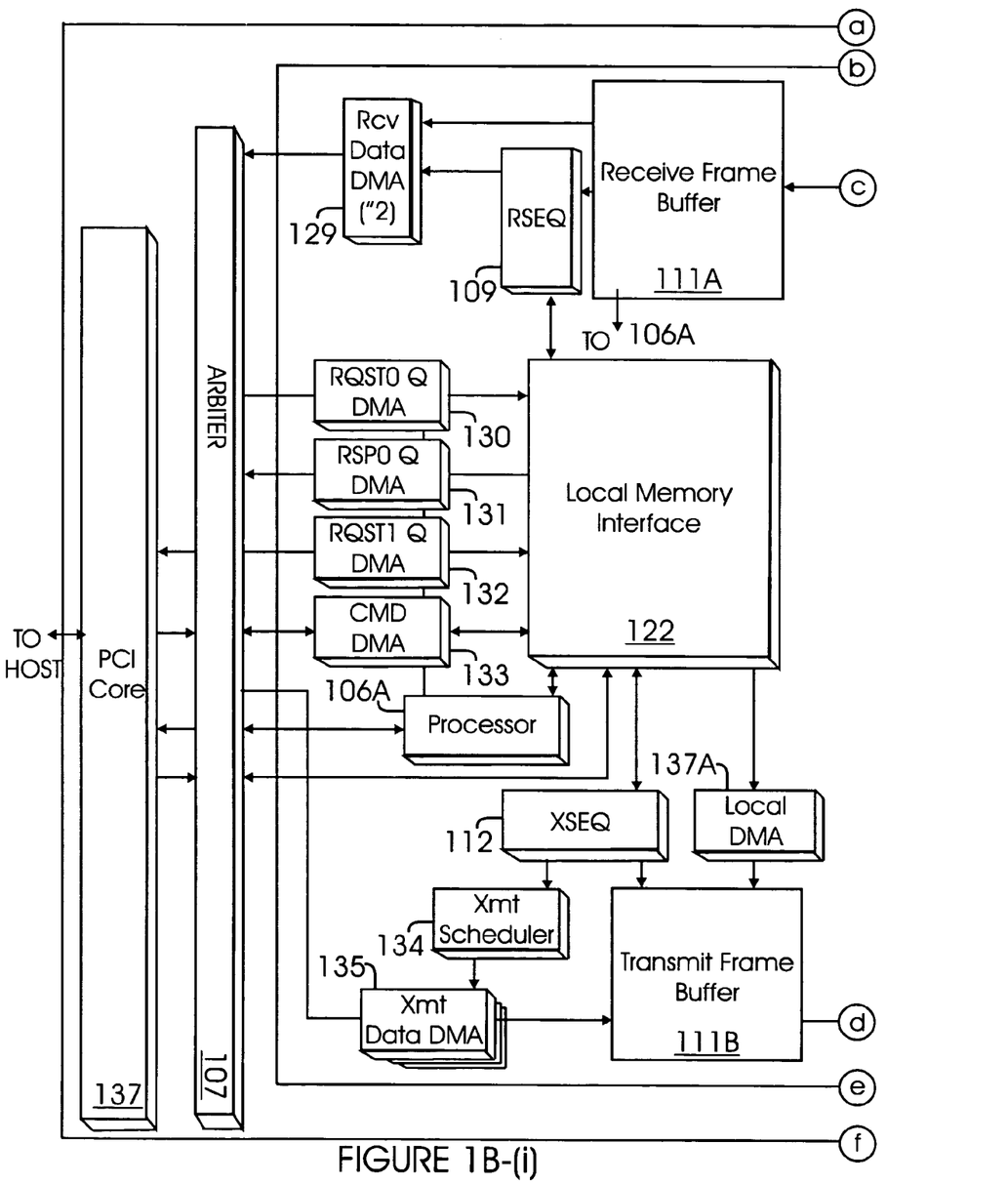
FIG. 1B shows a top-level diagram of a HBA interfacing with a credit extender, according to one aspect of the present invention.

HBA 106:

FIG. 1B shows a block diagram of adapter 106, used according to one aspect of the present invention. Adapter 106 includes processors (may also be referred to as "sequencers") 112 and 109 for transmit and receive side, respectively for processing data in the transmit and receive paths. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

HBA 106 is operationally coupled to a Fibre Channel credit extender 146 in the receive path. Frame traffic 146A from a Fibre Channel network enters the credit extender 146 and is then sent to the receive path of HBA 106 (shown as 146B).

Figure 2:
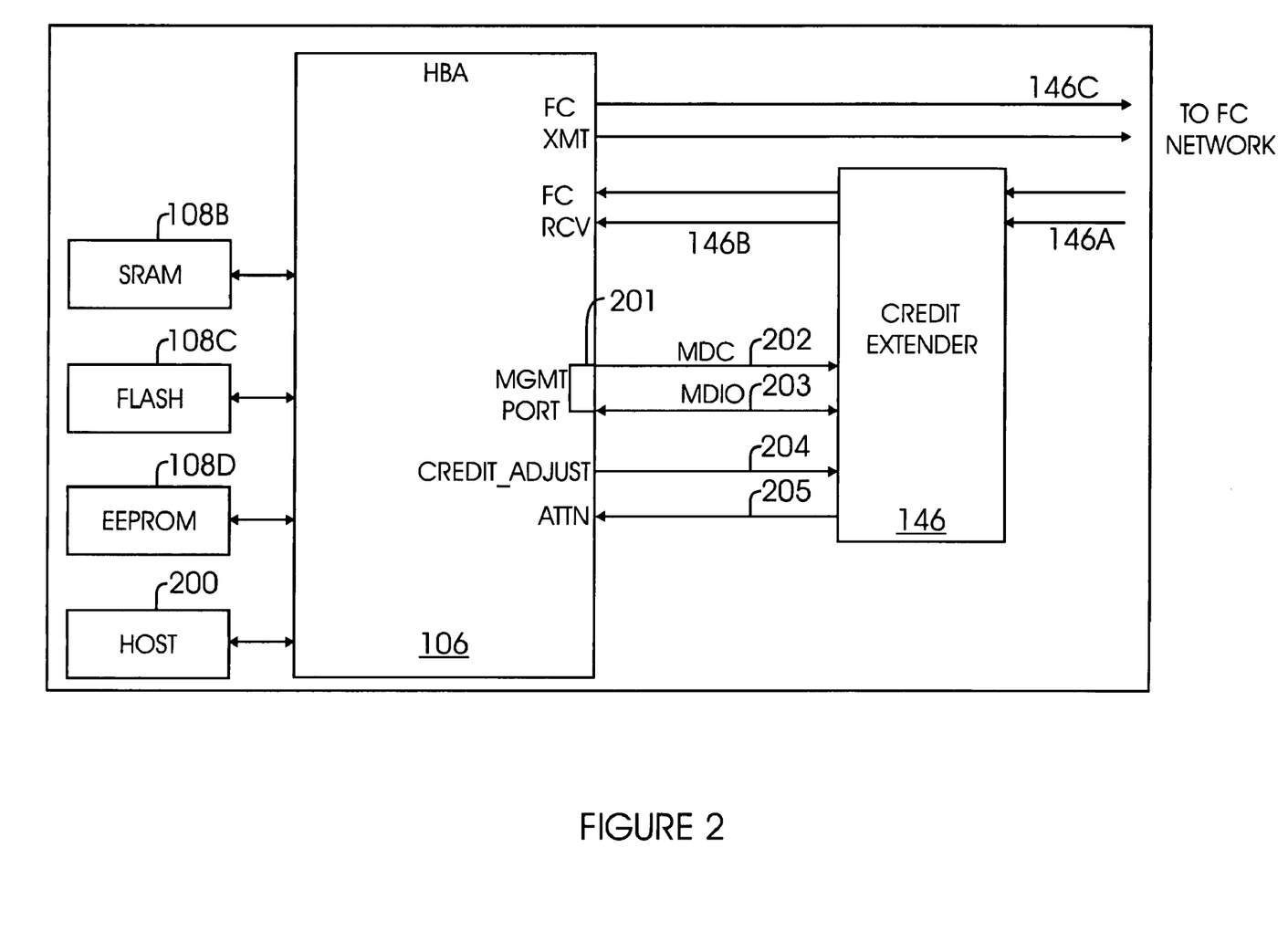
FIG. 2 shows a block diagram with the interfacing signals between the credit extender and the HBA, according to one aspect of the present invention.

Credit extender 146 with its various components is described in U.S. patent application Ser. No. 10/166,570, filed on Jun. 10, 2002 and Ser. No. 10/664,548, filed on Sep. 9, 2003; the disclosure of both the applications is incorporated herein by reference in its entirety. FIG. 2 below describes in detail the interaction between HBA 106 and credit extender 146.

Beside dedicated processors on the receive and transmit path, adapter 106 also includes processor 106A, which may be a reduced instruction set computer ("RISC") for performing various functions in adapter 106.

Adapter 106 also includes Fibre Channel interface (also referred to as Fibre Channel protocol manager "FPM") 113A that includes an FPM 113B and 113 in receive and transmit paths, respectively (shown as FC RCV and FC XMT in FIG. 1B). FPM 113B and FPM 113 allow data to move to/from other devices (not shown).

Adapter 106 is also coupled to external memory 108 and 110 (referred interchangeably hereinafter) through local memory interface 122 (via connection 116A and 116B, respectively, (FIG. 1A)). Local memory interface 122 is provided for managing local memory 108 and 110. Local DMA module 137A is used for gaining access to move data from local memory (108/110).

Adapter 106 also includes a serial/de-serializer ("SERDES") 136 for converting data from 10-bit serial to 8-bit parallel format and vice-versa.

Adapter 106 further includes request queue DMA channel (0) 130, response queue DMA channel 131, request queue (1) DMA channel 132 that interface with request queue 103 and response queue 104; and a command DMA channel 133 for managing command information.

Both receive and transmit paths have DMA modules 129 and 135, respectively. Transmit path also has a scheduler 134 that is coupled to processor 112 and schedules transmit operations. Arbiter 107 arbitrates between plural DMA channel requests.

FIG. 2 shows a block diagram with various interface signals between HBA 106 and credit extender 146 where the transmit path from HBA 106 is shown as 146C. HBA 106 can access static random access memory ("SRAM) 108B, Flash memory 108C and electrically erasable programmable read only memory ("EEPROM") 108D to execute various programmable instructions/code.

HBA 106 connects to credit extender 146 using a minimum number of ports for management. In one aspect of the present invention, Management Data Input Output ("MDIO") protocol, which is a standard protocol, is used. The MDIO protocol/standard is incorporated herein by reference in its entirety. Management port 201 is used to interface with credit extender 146 using signals 202 and 203.

Credit extender 146 receives incoming frames 146A. Credit_Adjust signal 204 is sent from HBA 106 to credit extender 146 to communicate that HBA 106 has a buffer available for a frame (i.e. granting permission to credit extender 146 to transmit a frame in the receive path). Credit extender 146 receives signal 204, synchronizes signal 204 with it's own reference clock and then validates signal 204. Signal 204 is time-sensitive and it toggles between a low to high and high to low transition each time a frame buffer in HBA 106 is freed. The rate at which signal 204 toggles determines how fast frames can be moved from credit extender 146 to HBA 106.

Credit extender 146 sends an ATTN signal 205 to HBA 106. Signal 205 indicates that an exception condition has occurred, which requires managerial intervention from HBA 106. In one aspect of the present invention, signal 205 is held high until cleared by a response from HBA 106 (that is received via signal 203). Since signal 205 is held high, it allows HBA 106 to synchronize, recognize and respond to signal 205. Since signal 205 is only asserted for exception conditions, this mechanism does not affect overall HBA 106 performance in facilitating data transfer.

During initialization, HBA 106 is set-up by firmware (software used by RISC 106A and other modules). The set-up indicates the amount of buffer space that is available in credit extender 146. When HBA 106 connects with another Fibre Channel port, HBA 106 transmits the number of available credits by using the R_RDY primitive based on credit extender 146's buffering capacity.

Figure 3:
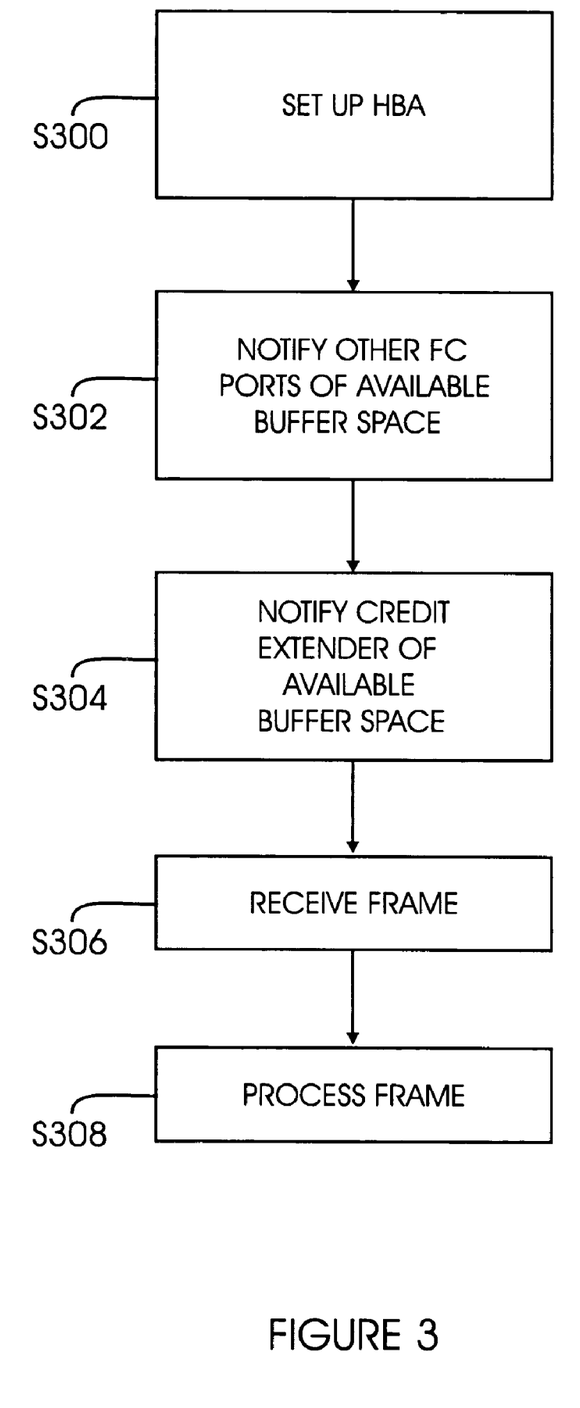
FIG. 3 shows a process flow diagram for interfacing the credit extender and the HBA, according to one aspect of the present invention.

FIG. 3 shows a process flow diagram for using credit extender 146 with HBA 106. In step S300, HBA 106 is set-up by firmware. During set-up, HBA 106 determines (or knows) the amount of buffer space that is available in credit extender 146.

In step S302, HBA 106 notifies other Fibre Channel ports of available buffer space (using R_RDY primitives). This allows other ports to send data to HBA 106 based on the buffer capacity of credit extender 146.

In step S304, HBA 106 notifies credit extender 146 of available buffer space to receive/process a frame.

In step S306, credit extender 146 sends frames to HBA 106. In step S308, RSEQ 109 processes the frame.

In one aspect of the present invention, using the credit extender 146 eliminates the need for additional data ports/buffers and overall latency in Fibre Channel transmission is reduced.

Although the present invention has been described with reference to specific embodiments, these embodiments are illustrative only and not limiting. Many other applications and embodiments of the present invention will be apparent in light of this disclosure and the following claims. For example, automatic DMA selection may be used beyond SANs and Fibre Channel standards. The foregoing adaptive aspects are useful for any networking environment where there is disparity between link transfer rates.

What is claimed is:

1. A storage area network ("SAN"), comprising:
a host bus adapter (HBA) of a host computing system operationally coupled with a credit extender, wherein upon HBA initialization, the HBA determines a buffer storage capacity of the credit extender and the HBA transmits a number of R_RDYs, a primitive to indicate credit availability, to at least one network device, where the number of R_RDYs are based on the buffer storage capacity of the credit extender instead of a buffer storage capacity of the HBA; and the credit extender receives frames directly from the network device via a Fibre Channel network instead of the HBA directly receiving the frames; and the credit extender sends the received frames to the HBA after the HBA sends a signal to the credit extender indicating that buffer space is available in a receive buffer of the HBA.

2. The SAN of claim 1, wherein the signal from the HBA to the credit extender indicating available buffer space in the HBA transitions from a first value to a second value and a rate at which the signal transitions from the first value to the second value determines a rate at which the received frames are moved from the credit extender to the HBA.

3. The SAN of claim 1, wherein the HBA communicates with the credit extender through a management port using a management data input/output protocol.

4. The SAN of claim 1, wherein the credit extender notifies the HBA of an exception condition by sending a signal to the HBA and the signal is cleared after the HBA responds to the exception condition.

5. A system for transferring data in a Fibre Channel network, comprising:
a host bus adapter (HBA) of a host computing system operationally coupled with a credit extender, wherein upon HBA initialization the HBA determines a buffer storage capacity of the credit extender and the HBA transmits a number of R_RDYs, a primitive to indicate credit availability, to at least one network device, where the number of R_RDYs are based on the buffer storage capacity of the credit extender instead of a buffer storage capacity of the HBA; and the credit extender receives frames directly from the network device via a Fibre Channel network instead of the HBA directly receiving the frames; and the credit extender sends the received frames to the HBA after the HBA sends a signal to the credit extender indicating that buffer space is available in a receive buffer of the HBA.

6. The system of claim 5, wherein the signal from the HBA to the credit extender indicating available buffer space in the HBA transitions from a first value to a second value and a rate at which the signal transitions from the first value to the second value determines a rate at which the received frames are moved from the credit extender to the HBA.

7. The system of claim 5, wherein the HBA communicates with the credit extender through a management port using a management data input/output protocol.

8. The system of claim 5, wherein the credit extender notifies the HBA of an exception condition by sending a signal to the HBA and the signal is cleared after the HBA responds to the exception condition.

9. A host bus adapter ("HBA") of a host computing system, comprising:
a management port for interfacing the HBA with a credit extender, wherein upon HBA initialization, the HBA determines a buffer storage capacity of the credit extender and the HBA transmits a number of R_RDYs, a primitive to indicate credit availability, to at least one network device, where the number of R_RDYs are based on the buffer storage capacity of the credit extender instead of a buffer storage capacity of the HBA; and the credit extender receives frames directly from the network device via a Fibre Channel network instead of the HBA directly receiving the frames; and the credit extender sends the received frames to the HBA after the HBA sends a signal to the credit extender indicating that buffer space is available in a receive buffer of the HBA.

10. The HBA of claim 9, wherein the signal from the HBA to the credit extender indicating available buffer space in the HBA transitions from a first value to a second value and a rate at which the signal transitions from the first value to the second value determines a rate at which the received frames are moved from the credit extender to the HBA.

11. The HBA of claim 9, wherein the HBA communicates with the credit extender through a management port using a management data input/output protocol.

12. The HBA of claim 9, wherein the credit extender notifies the HBA of an exception condition by sending a signal to the HBA and the signal is cleared after the HBA responds to the exception condition.

13. The HBA of claim 9, wherein the credit extender notifies the HBA of an exception condition by sending a signal to the HBA and the signal is cleared after the HBA responds to the exception condition.

14. A method for receiving network information in a storage area network, comprising:

determining, by a host bus adapter (HBA) a buffer capacity of a credit extender coupled to the HBA;

sending the HBA a number of primitives at least one network device that communicates with the HBA indicating available buffer space of the credit extender to the network device and the number of primitives that are sent are based on the buffer storage capacity of the credit extender instead of a buffer storage capacity of the HBA;

notifying the credit extender of available buffer space in a receive buffer of the HBA;

receiving a network frame from a network device and the network frame is received directly by the credit extender, instead of the HBA; and sending the network frame to the HBA and the network frame is processed by a receive buffer processor, instead of a main processor for the HBA.

15. The method of claim 14, wherein the HBA sends a signal to the credit extender indicating available buffer space in the HBA and the signal transitions from a first value to a second value and a rate at which the signal transitions from the first value to the second value determines a rate at which network frames are moved from the credit extender to the HBA.

16. The method of claim 14, wherein the HBA communicates with the credit extender through a management port using a management data input/output protocol.

17. The method of claim 14, wherein the primitive sent to the network device is an R_RDY primitive used in a Fibre Channel network.

18. The method of claim 14, wherein the network frame is a Fibre Channel frame.

* * * * *

UNITED STATES PATENT AND TRADEMARK OFFICE
CERTIFICATE OF CORRECTION

PATENT NO.        : 7,380,030 B2
APPLICATION NO.   : 10/956718
DATED             : May 27, 2008
INVENTOR(S)       : Oscar J. Grijalva et al.

It is certified that error appears in the above-identified patent and that said Letters Patent is hereby corrected as shown below:

On page 2, under "Other Publication", column 2, line 39, delete "18" and insert -- 24 --, therefor.

In column 6, line 12, in Claim 5, delete "initialization" and insert -- initialization, --, therefor.

In column 7, line 9, in Claim 14, delete "sending the HBA" and insert -- the HBA sending --, therefor.

Signed and Sealed this

Nineteenth Day of October, 2010

David J. Kappos
*Director of the United States Patent and Trademark Office*